Feb. 1, 1938.    K. F. GALLIMORE    2,106,731
SPEED CHANGE MECHANISM
Filed Aug. 9, 1934    2 Sheets-Sheet 1

INVENTOR
Keith F. Gallimore
By Chindall, Parker & Carlson
ATTORNEYS

Feb. 1, 1938.      K. F. GALLIMORE      2,106,731
SPEED CHANGE MECHANISM
Filed Aug. 9, 1934      2 Sheets-Sheet 2
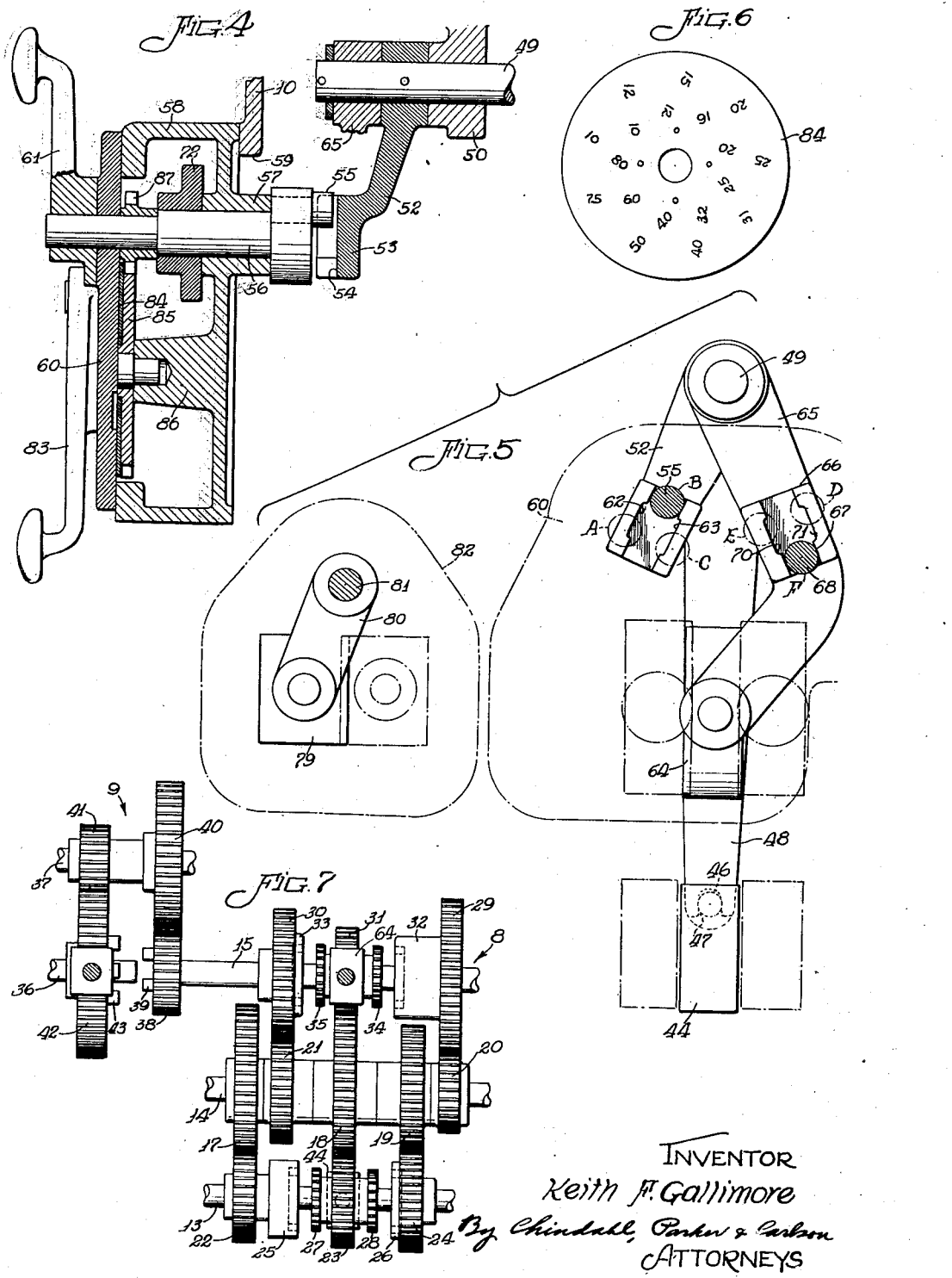
INVENTOR
Keith F. Gallimore
By Chindahl, Parker & Carlson
ATTORNEYS Patented Feb. 1, 1938

2,106,731

UNITED STATES PATENT OFFICE 2,106,731

SPEED-CHANGE MECHANISM

Keith F. Gallimore, Fond du Lac, Wis., assignor to Giddings & Lewis Machine Tool Co., Fond du Lac, Wis., a corporation of Wisconsin Application August 9, 1934, Serial No. 739,076

10 Claims. (Cl. 74—473)

The present invention relates to improvements in speed-change mechanisms, adapted particularly for machine tools.

One of the objects of the present invention resides in the provision of a speed-change gear mechanism having a novel crank-type adjusting means.

Another object is to provide new and improved gear shifting means which is simple in construction and operation, and which necessitates but a relatively small number of parts and operating members.

Further objects and advantages will become apparent as the description proceeds.

In the accompanying drawings, Figure 1 is a fragmentary front elevational view of a mechanism embodying the features of my invention.

Fig. 4 is a fragmentary sectional view on an enlarged scale taken substantially along line 4—4 of Fig. 1.

Fig. 5 is a fragmentary sectional view on an enlarged scale taken substantially along line 5—5 of Fig. 2, and illustrating the operation of the gear shifting means.

Fig. 6 is an elevational view of a dial for indicating the adjustment of the mechanism.

Fig. 7 is a fragmentary view of a development of a speed-change gearing forming part of the mechanism.

Figure 1:
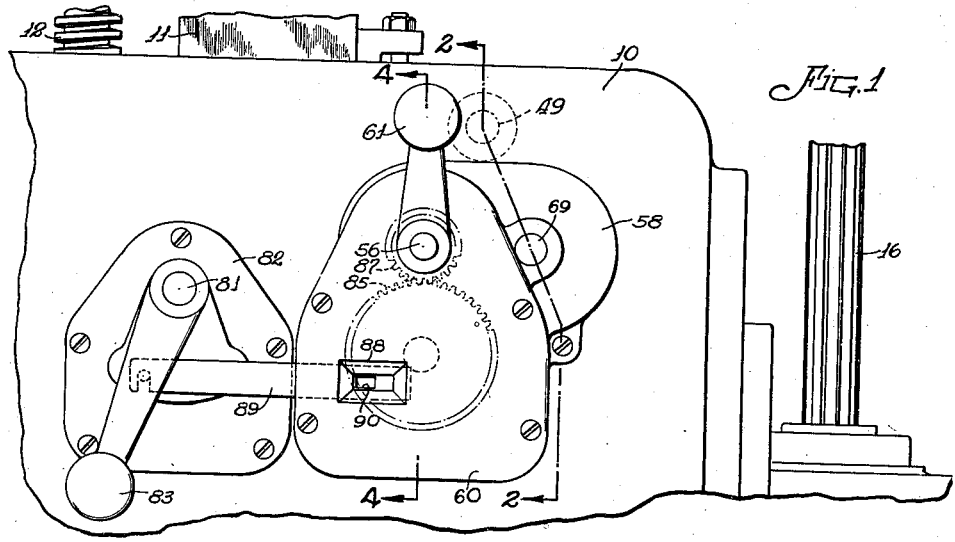

Referring more particularly to the drawings, the speed-change mechanism may be interposed in any desired drive, for example a rotative spindle drive or an axial-feed spindle drive, as disclosed in the patent to Gallimore No. 1,858,491, issued May 17, 1932, and may be adapted to afford any desired number of selective speeds.

In the present instance, the mechanism (see Fig. 7) is illustrated as comprising a nine speed gearing 8, which in effect comprises two three-speed gearings, and one two-speed gearing 9, connected in series to provide eighteen different available speeds. These gearings may be enclosed within a suitable casing 10 mounted for adjustment along parallel guideways 11 (one not shown) by means of a feed screw 12.

The nine-speed gearing 8 comprises an inlet shaft 13, an outlet shaft 15, and an intermediate shaft 14, all of said shafts being suitably journaled in the casing 10. The inlet shaft 13 is adapted to be connected to a suitable source of power, as for example to a spline shaft 16 extending slidably through the casing 10 and parallel to the guideways 11, and driven from a motor (not shown). Five gears 17, 18, 19, 20, and 21 are fixed in axial spaced relation on the intermediate shaft 14. Freely rotatable on the inlet shaft 13 in fixed axial spaced relation are two end gears 22 and 24 in mesh with the gears 17 and 19 and having clutch elements 25 and 26 on their adjacent sides. An intermediate gear 23 is splined for axial adjustment on the inlet shaft 13 between the gears 22 and 24, and has clutch elements 27 and 28 on opposite sides adapted to coact respectively with the elements 25 and 26.

The gear 23, with the clutch elements 27 and 28, constitutes a shiftable clutch unit having three different operative positions of adjustment for connecting the shafts 13 and 14 respectively through the gears 22 and 17, 23 and 18, and 24 and 19. These various gear combinations have different speed ratios so that the intermediate shaft 14 may be driven selectively at any one of three different speeds. In the present instance, the speed ratios decrease progressively in one direction. Thus, the ratios from left to right may be 19 to 37, 22 to 33, and 25 to 30.

Two gears 29 and 30, formed respectively on their adjacent sides with clutch elements 32 and 33, are freely rotatable on the outlet shaft 15, and mesh continuously with the gears 20 and 21 on the intermediate shaft 14. An intermediate gear 31 is splined for axial adjustment on the outlet shaft 15 between the gears 29 and 30, and has clutch elements 34 and 35 on opposite sides adapted to coact respectively with the elements 32 and 33.

The gear 31, with the clutch elements 34 and 35, constitutes a shiftable clutch unit having three different operative positions of adjustment for connecting the shafts 14 and 15 respectively through the gears 20 and 29, 21 and 30, and 18 and 31. These gears combinations have progressively decreasing speed ratios, for example 15 to 40, 24 to 32, and 33 to 32, for driving the shaft 15 at any one of three different speeds from the intermediate shaft 14.

By adjusting each of the clutch units 23 and 31 successively into positions of progressively lower speed ratios, and adjusting one unit, for example the unit 23, through all of its positions for each position of the other unit, the outlet shaft 15 may be driven at nine progressively increased speeds.

The two-speed gearing 9 is connected to the shaft 15, and comprises an outlet shaft 36 and a back shaft 37. Fixed on the shaft 15 is a gear 38 having a clutch element 39 on one side, and meshing with a gear 40 fixed on the back shaft 37. Another gear 41, fixed on the back shaft 37 in axially spaced relation to the gear 40, meshes with a gear 42 which is splined for axial adjustment on the shaft 36, and which has a clutch element 43 on one side for cooperative engagement with the element 39. The gear 42 constitutes a shiftable clutch unit for connecting the shafts 15 and 36, either directly through the clutch elements 39 and 43 at the same speed, or indirectly through the gears 38, 40, 41 and 42 at a relative speed, for example at a ratio of 8 to 1.

A shifter shoe 44 which is slidably supported on a rod 45 (Fig. 2) for rectilinear adjustment along the shaft 13, engages opposite sides of the clutch unit 23, and is adapted to move the latter into any one of its three positions of adjustment. The shoe 44 has a laterally extending pin 46 which projects into a notch 47 in the lower end of a vertical lever 48. The upper end of the lever 48 is fixed on the rear end of a forwardly extending rock shaft 49 journaled in bearings 50 and 51 in the casing 10. A depending lever 52 is fixed at its upper end on the forward end of the shaft 49. The levers 48 and 52 serve to confine the rock shaft 49 against endwise movement.

The lower end of the lever 52 has an enlarged head 53 (Fig. 4) formed with a generally longitudinal cam groove 54. An eccentric crank pin 55 mounted on the inner end of a crank shaft 56 extends operatively into the groove 54. The shaft 56 is journaled in a bearing 57 in the rear wall of a casing 58 closing an opening 59 in the front wall of the main casing 10. A removable cover plate 60 closes the front of the casing 58. The forward end of the shaft 56 extends through the casing 58, and is provided with an operating lever 61 at the front of the cover plate 60.

Upon rotation of the shaft 56, the crank pin 55, through coaction with the sides of the cam groove 54, will oscillate the lever 52, through a predetermined range, to shift the clutch unit 23. In the present instance, the crank pin 55 has three operative positions spaced 120 degrees apart, and identified by the characters A, B and C (Fig. 5). Opposed clearance recesses or grooves 62 and 63 are formed in opposite sides of the cam groove 54. In position A, the crank pin 55 engages the lower edge of the recess 62, thereby establishing the lever 52 in its extreme left-hand position to connect the clutch elements 25 and 27. This position is occupied for the first, fourth and seventh speed adjustments of the nine-speed gearing 8. The clearance recess 62 permits movement of the pin 55 into position B at the upper end of the groove 54 without causing over-travel of the lever 52 to the left. In position B, the lever 52 occupies an intermediate position to establish the gears 18 and 23 in meshing engagement for the second, fourth and eighth adjustments of the nine-speed gearing 8. Upon movement of the pin 55 into position C, the lever 52 is moved into its extreme right-hand position to connect the clutch elements 26 and 28. The clearance recess 63 prevents over-travel of the lever 52 to the right. This position serves for the third, sixth and ninth speed adjustments of the nine-speed gearing 8. Upon adjustment of the pin 55 back into position A, the parts operated thereby are returned in one continuous reverse movement into their initial positions.

Figure 2:
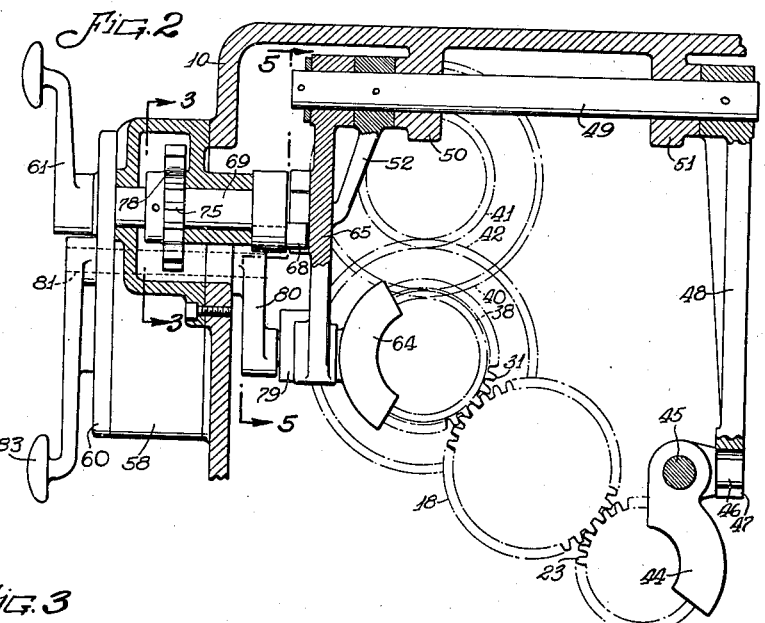
Fig. 2 is a fragmentary vertical sectional view taken substantially along line 2—2 of Fig. 1.

A clutch shoe 64 engages opposite sides of the clutch unit 31, and is pivotally mounted in the lower end of a generally vertical bent lever 65 rotatably secured at its upper end on the forward end of the shaft 49 (Figs. 2 and 5). The lever 65 is provided intermediate its ends with an enlarged head 66 formed with a longitudinal cam groove 67 similar to the groove 54. An eccentric crank pin 68 on the inner end of a shaft 69, extending through and journaled in the casing 58, projects into operative engagement with the groove 67.

Upon rotation of the shaft 69 in a counter-clockwise direction, the pin 68 will be revolved successively into operative positions D, E and F in which connections will be established respectively between the clutch elements 32 and 34, the clutch elements 35 and 33, and the gears 18 and 31. Clearance grooves 70 and 71 avoid over-travel of the lever 65 beyond its end positions. The pin 68 occupies position D for the first, second and third speed adjustments, the position E for the fourth, fifth and sixth speed adjustments, and the position F for the seventh, eighth and ninth speed adjustments, of the nine-speed gearing 8.

Figure 3:
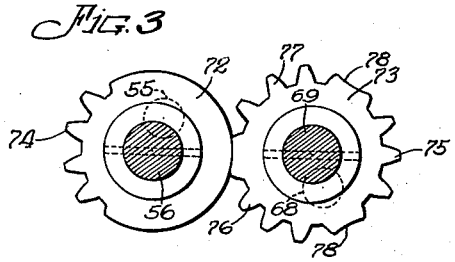
Fig. 3 is a fragmentary detail sectional view taken substantially along line 3—3 of Fig. 2, and illustrating two intermittent gears.

Means is provided for rotating the crank shaft 69 through 120 degrees once for each complete rotation of the shaft 56. This means preferably comprises two intermittent gears 72 and 73 (Figs. 3 and 4) fixed respectively on the shafts 56 and 69 in the casing 58. The gear 72 has a toothed section 74 extending through 120 degrees, and adapted to mesh successively with three similar toothed sections 75, 76 and 77 on the gear 73 during recurrent movements of the pin 55 between positions A and C. Abutments 78 separating the toothed sections 75, 76 and 77 on the gear 73 are movable selectively into engagement with the untoothed portion of the gear 72 to lock the gear 73 in fixed position during movement of the pin 55 between the positions A and B, and B and C.

To provide means for adjusting the two-speed gearing 9, a shoe 79 (Figs. 2 and 5) is pivotally mounted on the lower end of a crank arm 80, and engages opposite sides of the clutch unit 42. The crank arm 80 is fixed on the inner end of a rock shaft 81 journaled in a cover plate 82 on the front of the casing 10, and provided on its outer end with a hand lever 83.

It will be evident that upon rotation of the shaft 56 in a clockwise direction, the gearing 8 will be adjusted to obtain a sequence of nine different speeds of progressively increasing values. When the two-speed gearing 9 is closed through the back shaft 37, these nine speeds, on the basis of the present gear ratios, are represented respectively as .75, 1.0, 1.2, 1.5, 2.0, 2.5, 3.1, 4.0, and 5.0. The corresponding speeds, obtained when the shafts 15 and 36 are directly connected, are represented respectively as 6.0, 8.0, 10, 12, 16, 20, 25, 32 and 40.

To provide visual means for indicating at all times the composite adjustment of the gearings 8 and 9, the two foregoing series of speed indicia are placed in two concentric rows on the face of a rotary dial 84 (Fig. 6). The latter is secured against one side of a gear 85 which is mounted for rotation on a projection 86 within the casing 58 (Fig. 4), and which meshes with a gear 87 on the shaft 56 (Fig. 1). A sight opening 88 is formed in the cover plate 60 to extend across the two rows of indicia on the dial 84 so that the associated pairs of indicia corresponding to the various adjustments of the gearing 8 will be selectively exposed to view.

Extending into one side of the casing 58 between the cover plate 60 and the dial 84 is a slide bar 89. The outer end of the bar 89 has a pivotal connection with the lever 83. The inner end of the bar 89 has a sight opening 90 in registration with the opening 88, and movable selectively into position over the particular row of indicia on the dial 84 representing the adjustment of the two-speed gearing 9.

I claim as my invention:

1. A speed-change mechanism comprising, in combination, a speed-change gearing having a shiftable gear element, a shiftable shoe engaging said element, a rock shaft, a lever fixed at one end on said shaft and having a pin and notch connection at the other end with said shoe, a second lever fixed at one end on said shaft and formed with a generally longitudinal cam groove, a crank shaft having an eccentric crank pin on one end projecting transversely into said groove, and means for rotating said crank shaft, whereby said rock shaft will be oscillated to shift said element in opposite directions, said cam groove having clearance recesses formed in the sides thereof for preventing over-travel of said shiftable gear element.

2. A speed-change mechanism comprising, in combination, a speed-change device having a reversibly adjustable element, a rock shaft, a lever fixed on said shaft and having an operative connection with said element, a second lever fixed on said shaft and formed with a generally longitudinal cam groove, a crank shaft having a crank pin projecting transversely into said groove, and means for rotating said crank shaft whereby said rock shaft will be oscillated to adjust said element, said cam groove having clearance recesses formed in the sides thereof for preventing over-travel of said element.

3. A speed-change mechanism comprising, in combination, a speed-change device having a reversibly adjustable element, a shiftable shoe engaging said element, an oscillatory lever having an operative connection with said shoe and formed with a generally longitudinal cam groove, a crank shaft having a crank pin projecting transversely into said groove, and means for rotating said crank shaft, whereby said lever will be oscillated to adjust said element in opposite directions through a predetermined range, said cam groove being contoured to provide a plurality of inwardly disposed surfaces contacting with said crank pin to position said oscillatory lever and associated shiftable shoe in selected positions, said surfaces being separated by clearance spaces whereby said lever will be oscillated only within said predetermined range of movement and over-travel thereof prevented.

4. A speed-change mechanism comprising, in combination, a speed-change device having an adjusting element with three operative positions, a reversibly movable member operatively connected to said element for adjusting the latter and having a cam groove, a revolvable crank pin extending laterally into said groove and having three operative positions spaced 120 degrees apart and of which two positions define opposite end adjustments of said element and the third position defines an intermediate adjustment of said element, and clearance recesses formed in the sides of said groove for preventing over-travel of said member upon movement of said pin between said third position and either of said two positions.

5. A speed-change mechanism comprising, in combination, a speed-change device having an adjusting element, a reversibly movable member operatively connected to said element for adjusting the latter and having a cam groove, a revolvable crank pin extending operatively into said groove, and clearance recesses formed in the sides of said groove for preventing over-travel of said member.

6. A speed-change mechanism comprising, in combination, a casing, a speed-change gearing in said casing and having two selectively shiftable gear elements, two shifter shoes respectively engaging said elements, a rock shaft journaled in said casing and extending transversely of the direction of movement of said elements, a lever fixed on said shaft and having a pivotal connection with one of said shoes, a second lever pivoted on said shaft and having a pivotal connection with the other of said shoes, a third lever fixed on said shaft and extending at an angle to said second lever, said second and third levers being formed respectively with generally longitudinal cam grooves, two crank shafts journaled in said casing and parallel to said rock shaft, two eccentrically disposed crank pins on the ends of said crank shafts and projecting respectively into said cam grooves, and means for rotating said crank shafts.

7. A speed-change mechanism comprising, in combination, a casing, a speed-change gearing in said casing and having two selectively shiftable elements, two shifter shoes respectively engaging said elements, a rock shaft journaled in said casing and extending transversely of the direction of movement of said elements, a lever fixed on said shaft and having a positive pivotal connection with one of said shoes, a second lever pivoted on said shaft and having a positive pivotal connection with the other of said shoes, a third lever fixed on said shaft and extending at an angle to said second lever, said second and third levers being formed respectively with generally longitudinal cam grooves, two crank shafts journaled in said casing and parallel to said rock shaft, two crank pins on said crank shafts and projecting respectively into said cam grooves, said grooves having relief areas to prevent over-adjustment of said shoes, means for rotating one of said crank shafts, and intermittent drive means connecting said crank shafts for rotating the other of said crank shafts through a fractional turn for each complete rotation of said one crank shaft.

8. A speed-change mechanism comprising, in combination, a casing, a speed-change device in said casing and having two selectively adjustable elements, two pivotally mounted independently oscillatory levers operatively connected respectively to said elements, said levers being formed respectively with generally longitudinal cam grooves, two crank shafts journaled in said casing and having crank pins projecting respectively into said cam grooves and operable upon being revolved and through coaction with the sides of said grooves to oscillate said levers, means for rotating one of said shafts, and intermittent drive means connecting said shafts for rotating the other of said shafts through a fractional turn for each complete rotation of said one shaft.

9. A speed-change mechanism comprising, in combination, a nine-speed gearing having two adjusting elements movable in parallel directions and each having two end positions and an intermediate position of adjustment, two levers operatively connected to said elements and oscillatory in directions parallel to said first mentioned directions and each being formed with a cam groove having a component extending longitudinally thereof, two parallel crank shafts extending perpendicularly to said levers and having crank pins projecting respectively into operative engagement with said grooves, an intermittent gear on one of said shafts and having three gear sectors each extending through 120 degrees, an intermittent gear on the other of said shafts and having a single gear sector extending through 120 degrees for selective meshing engagement with said first mentioned sectors to rotate said one shaft through one-third revolution once for each complete revolution of said other shaft, and means for rotating said other shaft.

10. A speed-change mechanism comprising, in combination, a speed-change gearing having two adjusting elements, two pivotally mounted oscillatory levers operatively connected to said elements and each being formed with a cam groove having a component extending longitudinally thereof, two parallel crank shafts extending perpendicularly to said levers and having crank pins projecting respectively into operative engagement with said grooves and operable upon being revolved and through coaction with the sides of said grooves to oscillate said levers, an intermittent gear on one of said shafts and having a plurality of gear sectors, an intermittent gear on the other of said shafts and having a single gear sector for selective meshing engagement with said first mentioned sectors to rotate said one shaft through a fractional revolution once for each complete revolution of said other shaft, and means for rotating said other shaft.

KEITH F. GALLIMORE.